United States Patent
Sebastian (10) Patent No.: US 8,966,053 B2
(45) Date of Patent: Feb. 24, 2015

(54) METHODS AND SYSTEMS FOR PERFORMING A PREFETCH ABORT OPERATION FOR NETWORK ACCELERATION

(75) Inventor: William B. Sebastian, Quincy, MA (US)

(73) Assignee: ViaSat, Inc., Calsbad, CA (US)

( * ) Notice: Subject to any disclaimer, the term of this patent is extended or adjusted under 35 U.S.C. 154(b) by 1275 days.

(21) Appl. No.: 12/172,913

(22) Filed: Jul. 14, 2008

(65) Prior Publication Data
US 2009/0019153 A1   Jan. 15, 2009

Related U.S. Application Data

(60) Provisional application No. 60/949,492, filed on Jul. 12, 2007.

(51) Int. Cl.
G06F 15/173 (2006.01)
G06F 17/30 (2006.01)
H04L 29/08 (2006.01)

(52) U.S. Cl.
CPC ...... G06F 17/30902 (2013.01); H04L 67/2847 (2013.01)
USPC ...................................................... 709/224

(58) Field of Classification Search
CPC .................................................. H04L 67/2847
USPC ......... 709/203, 213, 219, 223, 231–233, 235, 709/217, 218, 220, 224; 711/126, 137; 370/231; 703/2
See application file for complete search history.

(56) References Cited

U.S. PATENT DOCUMENTS 5,802,292 A * 9/1998 Mogul .......................... 709/203
5,844,885 A 12/1998 Grob et al.
(Continued)

FOREIGN PATENT DOCUMENTS

AU   2010203401 B2   4/2014
EP   1398715 A2   3/2004
(Continued)

OTHER PUBLICATIONS

Fan, L., Cao, P., Lin, W., and Jacobson, Q. 1999. Web prefetching between low-bandwidth clients and proxies: potential and performance. In Proceedings of the 1999 ACM SIGMETRICS international Conference on Measurement and Modeling of Computer Systems (Atlanta, Georgia, United States, May 1-4, 1999). SIGMETRICS '99. ACM, New York, NY, 178-187.*

(Continued)

Primary Examiner — Imad Hussain
(74) Attorney, Agent, or Firm — Kilpatrick Townsend & Stockton LLP (57) ABSTRACT

The present invention relates to systems, apparatus, and methods of determining whether to abort a prefetch operation. The method includes receiving a prefetched object downloaded from a content server, and checking the prefetched object to determine the prefetched object's size. The method further includes determining a probability of use of the prefetched object, checking a link between a server and a client to determine the link's bandwidth, and checking the link between the server and the client to determine the link's latency. In addition, the method includes, based on at least one of the size of the prefetched object, the probability of use of the prefetched object, the bandwidth of the link, and the latency of the link, determining whether to forward the prefetched object to the client.

19 Claims, 5 Drawing Sheets

FIG. 2

(56) References Cited

U.S. PATENT DOCUMENTS

| | | | |
|---|---|---|---|
| 5,936,940 A | 8/1999 | Marin et al. | |
| 6,085,193 A * | 7/2000 | Malkin et al. | 1/1 |
| 6,138,189 A | 10/2000 | Kalkunte | |
| 6,192,029 B1 | 2/2001 | Averbuch et al. | |
| 6,195,622 B1 * | 2/2001 | Altschuler et al. | 703/2 |
| 6,263,020 B1 | 7/2001 | Gardos et al. | |
| 6,310,857 B1 | 10/2001 | Duffield et al. | |
| 6,330,561 B1 | 12/2001 | Cohen et al. | |
| 6,388,994 B1 | 5/2002 | Murase | |
| 6,389,422 B1 | 5/2002 | Doi et al. | |
| 6,424,624 B1 | 7/2002 | Galand et al. | |
| 6,453,404 B1 | 9/2002 | Bereznyi et al. | |
| 6,505,253 B1 * | 1/2003 | Chiu et al. | 709/235 |
| 6,553,411 B1 | 4/2003 | Dias et al. | |
| 6,584,567 B1 | 6/2003 | Bellwood et al. | |
| 6,658,463 B1 | 12/2003 | Dillon et al. | |
| 6,701,372 B2 | 3/2004 | Yano et al. | |
| 6,850,541 B2 | 2/2005 | Gross | |
| 6,910,079 B2 | 6/2005 | Zimmermann et al. | |
| 6,964,014 B1 | 11/2005 | Parish | |
| 7,054,917 B1 | 5/2006 | Kirsch et al. | |
| 7,103,714 B1 | 9/2006 | Jacobs et al. | |
| 7,111,092 B1 | 9/2006 | Mitten et al. | |
| 7,130,890 B1 * | 10/2006 | Kumar et al. | 709/218 |
| 7,251,246 B2 | 7/2007 | Ross | |
| 7,266,613 B1 | 9/2007 | Brown et al. | |
| 7,272,111 B2 | 9/2007 | Zukerman et al. | |
| 7,277,391 B1 | 10/2007 | Aweya et al. | |
| 7,284,065 B2 | 10/2007 | Agarwal et al. | |
| 7,359,395 B2 | 4/2008 | Toporek et al. | |
| 7,359,890 B1 * | 4/2008 | Ku et al. | 1/1 |
| 7,369,498 B1 | 5/2008 | Ma et al. | |
| 7,383,338 B2 | 6/2008 | Allen | |
| 7,389,330 B2 * | 6/2008 | Dillon et al. | 709/219 |
| 7,437,438 B2 * | 10/2008 | Mogul et al. | 709/223 |
| 7,443,804 B2 | 10/2008 | Cheung et al. | |
| 7,450,509 B2 | 11/2008 | Hao | |
| 7,450,602 B2 | 11/2008 | Vazquez | |
| 7,453,798 B2 | 11/2008 | Bradford et al. | |
| 7,543,073 B2 | 6/2009 | Chou et al. | |
| 7,555,488 B2 * | 6/2009 | Bernstein et al. | 1/1 |
| 7,564,901 B2 | 7/2009 | Wang et al. | |
| 7,587,398 B1 | 9/2009 | Fredricksen et al. | |
| 7,603,616 B2 * | 10/2009 | Obata et al. | 715/205 |
| 7,606,249 B1 | 10/2009 | Swenson | |
| 7,640,353 B2 * | 12/2009 | Shen et al. | 709/231 |
| 7,711,797 B1 * | 5/2010 | Huang | 709/218 |
| 8,171,135 B2 | 5/2012 | Sebastian et al. | |
| 2001/0032269 A1 | 10/2001 | Wilson | |
| 2002/0010761 A1 * | 1/2002 | Carneal et al. | 709/219 |
| 2002/0062384 A1 * | 5/2002 | Tso | 709/229 |
| 2002/0080721 A1 | 6/2002 | Tobagi et al. | |
| 2002/0116411 A1 | 8/2002 | Peters et al. | |
| 2002/0131419 A1 | 9/2002 | Tamai | |
| 2002/0194361 A1 | 12/2002 | Itoh et al. | |
| 2003/0053482 A1 | 3/2003 | Li | |
| 2003/0061371 A1 | 3/2003 | Deshpande | |
| 2003/0061387 A1 | 3/2003 | Brown et al. | |
| 2003/0061451 A1 * | 3/2003 | Beyda | 711/137 |
| 2003/0088690 A1 | 5/2003 | Zuckerman et al. | |
| 2003/0112772 A1 | 6/2003 | Chatterjee et al. | |
| 2003/0115281 A1 * | 6/2003 | McHenry et al. | 709/213 |
| 2003/0126232 A1 * | 7/2003 | Mogul et al. | 709/219 |
| 2003/0182437 A1 * | 9/2003 | Kobayashi et al. | 709/232 |
| 2004/0016000 A1 | 1/2004 | Zhang et al. | |
| 2004/0199659 A1 | 10/2004 | Ishikawa et al. | |
| 2004/0205149 A1 | 10/2004 | Dillon et al. | |
| 2004/0215717 A1 | 10/2004 | Seifert et al. | |
| 2005/0063392 A1 | 3/2005 | Ofuji et al. | |
| 2005/0071876 A1 | 3/2005 | Van Beek | |
| 2005/0177866 A1 | 8/2005 | Kirsch | |
| 2005/0210121 A1 | 9/2005 | Taylor et al. | |
| 2005/0220024 A1 | 10/2005 | Agin et al. | |
| 2006/0150076 A1 | 7/2006 | Starbird | |
| 2006/0294223 A1 | 12/2006 | Glasgow et al. | |
| 2007/0038853 A1 | 2/2007 | Day et al. | |
| 2007/0185986 A1 | 8/2007 | Griffin et al. | |
| 2008/0005736 A1 * | 1/2008 | Apacible et al. | 718/100 |
| 2008/0208789 A1 * | 8/2008 | Almog | 706/54 |
| 2008/0225719 A1 | 9/2008 | Korrapati et al. | |
| 2008/0228899 A1 * | 9/2008 | Plamondon | 709/219 |
| 2008/0228938 A1 | 9/2008 | Plamondon | |
| 2008/0229025 A1 * | 9/2008 | Plamondon | 711/126 |
| 2008/0229381 A1 | 9/2008 | Sikka et al. | |
| 2009/0016222 A1 | 1/2009 | Sebastian | |
| 2009/0016240 A1 | 1/2009 | Sebastian | |
| 2009/0019105 A1 | 1/2009 | Sebastian | |
| 2009/0094417 A1 * | 4/2009 | Carlson et al. | 711/137 |
| 2009/0100228 A1 | 4/2009 | Lepeska et al. | |
| 2009/0287842 A1 * | 11/2009 | Plamondon | 709/233 |
| 2009/0292791 A1 * | 11/2009 | Livshits et al. | 709/217 |
| 2010/0067378 A1 * | 3/2010 | Cohen et al. | 370/231 |
| 2010/0088398 A1 * | 4/2010 | Plamondon | 709/220 |
| 2010/0146415 A1 | 6/2010 | Lepeska | |
| 2010/0180005 A1 | 7/2010 | Sebastian et al. | |
| 2010/0180082 A1 | 7/2010 | Sebastian et al. | |
| 2013/0124621 A1 | 5/2013 | Lepeska et al. | |

FOREIGN PATENT DOCUMENTS

| | | |
|---|---|---|
| EP | 2386164 A2 | 11/2011 |
| GB | 2425194 A | 10/2006 |
| WO | WO 01/03398 A | 1/2001 |
| WO | WO-2005/094044 A1 | 10/2005 |
| WO | WO-2010/081160 A2 | 7/2010 |

OTHER PUBLICATIONS

Chen, X. and Zhang, X. 2001. Coordinated data prefetching by utilizing reference information at both proxy and web servers. Sigmetrics Perform. Eval. Rev. 29, 2 (Sep. 2001), 32-38.*

Domenech, J., Sahuquillo, J., Gil, J. A., and Pont, A. 2006. The Impact of the Web Prefetching Architecture on the Limits of Reducing User's Perceived Latency. In Proceedings of the 2006 IEEE/WIC/ACM international Conference on Web intelligence (Dec. 18-22, 2006). Web Intelligence. IEEE Computer Society, Washington, DC, 740-744.*

PCT International Search Report and Written Opinion mailed Mar. 11, 2009, International Publication No. PCT/US2008/078161, 12 pages.

U.S. Appl. No. 12/252,181, filed Oct. 15, 2008.

U.S. Appl. No. 12/172,925, Notice of Allowance mailed Apr. 13, 2010, 12 pages.

U.S. Appl. No. 12/172,920, Office Action mailed Mar. 8, 2010, 12 pages.

U.S. Appl. No. 12/172,920, Final Office Action mailed Jul. 13, 2010, 11 pages.

U.S. Appl. No. 12/172,917 filed Jul. 14, 2008, Office Action mailed Jul. 19, 2010, 20 pages.

Banga et al., "Optimistic Deltas for WWW Latency Reduction", Proceedings of the 1997 USENIX Technical Conference, Jan. 1997, 15 pgs.

Kroeger et al., "Exploring the Bounds of Web Latency Reduction from Caching and Prefetching", Proceedings of the USENIX Symposium on Internet Technologies and Systems, Dec. 1997, 11 pgs.

Wills et al., "Towards a better understanding of Web resources and server responses for improved caching", Computer Networks, vol. 31, Issues 11-16, May 1999, pp. 1231-1243.

International Search Report and Written Opinion mailed in International Application No. PCT/US2010/020795 on Oct. 27, 2010, 19 pgs.

International Preliminary Report on Patentability mailed in International Application No. PCT/US2010/020795 on Jul. 12, 2011, 13 pgs.

Non-Final Office Action mailed in U.S. Appl. No. 12/252,181 on Sep. 28, 2010, 14 pgs.

Final Office Action mailed in U.S. Appl. No. 12/252,181 on Mar. 3, 2011, 14 pgs.

Non-Final Office Action mailed in U.S. Appl. No. 12/252,181 on Oct. 16, 2012, 19 pgs.

(56) References Cited

OTHER PUBLICATIONS

Final Office Action mailed in U.S. Appl. No. 12/252,181 on Apr. 25, 2013, 20 pgs.
Final Office Action mailed in U.S. Appl. No. 12/252,181 on Aug. 6, 2013, 21 pgs.
Non-Final Office Action mailed in U.S. Appl. No. 12/252,181 on Mar. 27, 2014, 23 pgs.
Final Office Action mailed in U.S. Appl. No. 12/252,181 on Sep. 9, 2014, 26 pgs.
Non-Final Office Action mailed in U.S. Appl. No. 12/571,288 on Dec. 2, 2010, 21 pgs.
Non-Final Office Action mailed in U.S. Appl. No. 12/685,691 on Sep. 4, 2012, 17 pgs.
U.S. Appl. No. 13/738,941, filed Jan. 10, 2013, 35 pgs.

* cited by examiner

METHODS AND SYSTEMS FOR PERFORMING A PREFETCH ABORT OPERATION FOR NETWORK ACCELERATION

PRIORITY CLAIM

This application claims priority to U.S. Provisional Patent Application Ser. No. 60/949,492, filed Jul. 12, 2007, entitled "METHODS AND SYSTEMS FOR PERFORMING A PREFETCH ABORT OPERATION,", which is hereby incorporated be reference herein in its entirety for any purpose.

FIELD OF THE INVENTION

The present invention relates, in general, to network acceleration and, more particularly, to performing prefetch abort operations.

BACKGROUND

Presently, prefetching blindly downloads content which may or may not be utilized by a client system in the future. Such an operation is performed without any consideration for the probability that the object may actually be used, nor does prefetching take into consideration the size of the object, the bandwidth of the link between the client and the content server, etc. As a result, a considerable amount of bandwidth, server capacity, and storage space is wasted on prefetched content which is never actually used. Hence, improvements in the art are needed.

BRIEF SUMMARY

Embodiments of the present invention are directed to a method of determining whether to abort a prefetch operation. The method includes receiving a prefetched object downloaded from a content server, and checking the prefetched object to determine the prefetched object's size. The method further includes determining a probability of use of the prefetched object, checking a link between a server and a client to determine the link's bandwidth, and checking the link between the server and the client to determine the link's latency. In addition, the method includes, based on at least one of the size of the prefetched object, the probability of use of the prefetched object, the bandwidth of the link, and the latency of the link, determining whether to forward the prefetched object to the client.

According to a further embodiment, a system for determining whether to abort a prefetch operation is described. The system includes a content server is configured to transmit objects over a network connection. The system further includes a proxy server coupled with the content server. The proxy server is configured to receive a prefetched object from the content server, check the prefetched object to determine the prefetched object's size, and determine a probability of use of the prefetched object. The proxy server is further configured to check a link between a server and a client to determine the link's bandwidth, check the link between the server and the client to determine the link's latency, and, based on at least one of the size of the prefetched object, the probability of use of the prefetched object, the bandwidth of the link, and the latency of the link, determine whether to forward the prefetched object to the client. The system also includes a client coupled with the proxy server. The client is configured to, based on the proxy server's determination to forward the prefetched object, receive the prefetched object form the proxy server.

In an alternative embodiment, a machine-readable medium for determining whether to abort a prefetch operation is described. The machine-readable medium includes instructions for receiving a prefetched object downloaded from a content server and checking the prefetched object to determine the prefetched object's size. The machine-readable medium further includes instructions for determining a probability of use of the prefetched object, checking a link between a server and a client to determine the link's bandwidth, and checking the link between the server and the client to determine the link's latency. In addition, the machine-readable medium includes instructions for, based on at least one of the size of the prefetched object, the probability of use of the prefetched object, the bandwidth of the link, and the latency of the link, determining whether to forward the prefetched object to the client.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to performing prefetch abort operations. A prefetch abort operation allows for a proxy server to abort the prefetching of various objects. Whether or not to abort a prefetch is determined by performing a cost-benefit analysis on the object to be prefetched. Based on various factors, if the cost of prefetching an object outweighs the benefit, then the prefetch operation is aborted, thus allowing for a more efficient use of server resources as well as better network acceleration.

Figure 1:
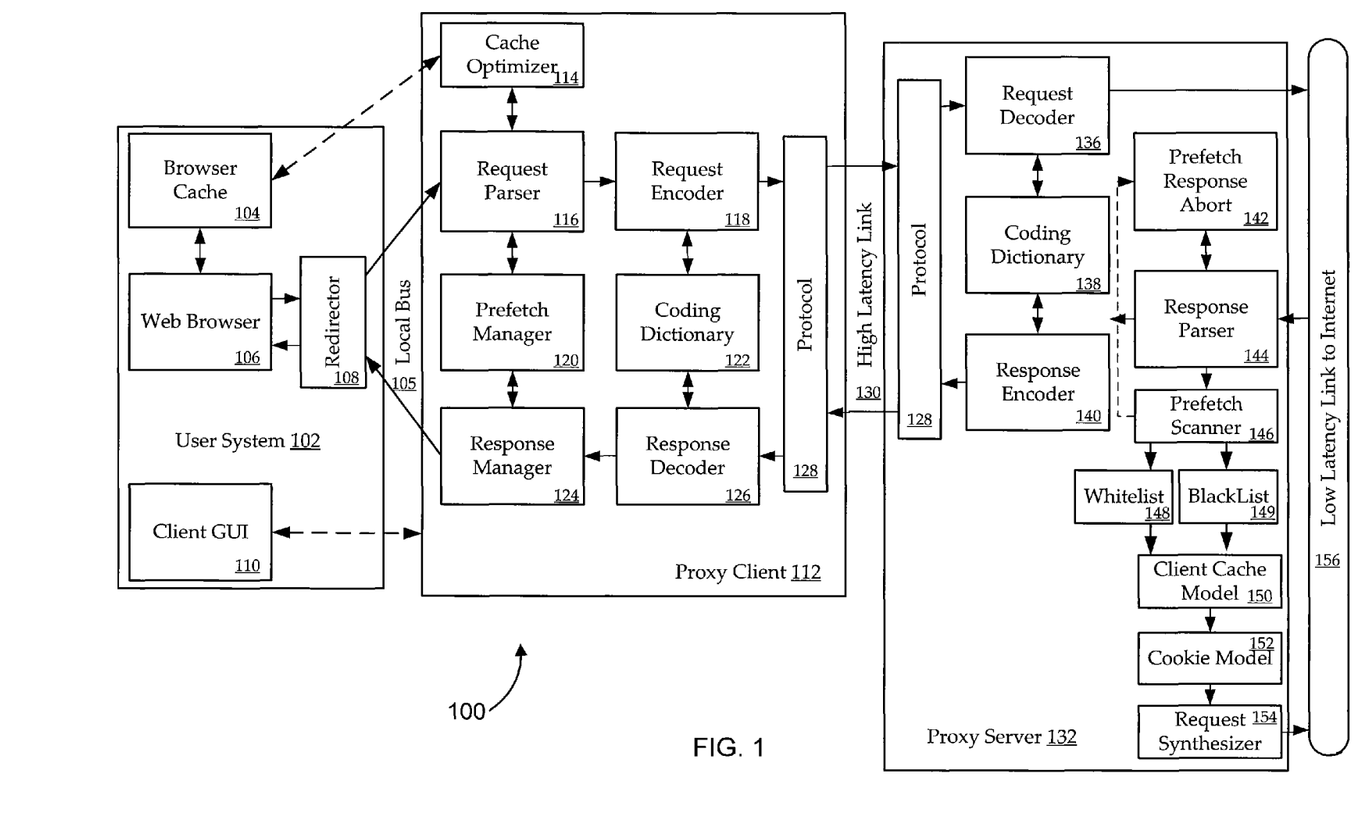
FIG. 1 is a block diagram illustrating a system for performing prefetch abort operations, according to embodiments of the present invention.

Turning now to FIG. 1, which illustrates a system 100 for optimizing transfer of content from the Internet to a web browser. In one embodiment, the system may include a user system 102, a proxy client 112 and a proxy server 132. The user system may include a client graphical user interface (GUI) 110. Client GUI 110 may allow a user to configure performance aspects of system 100. For example, the user may adjust the compression parameters and/or algorithms, content filters (e.g., blocks elicit websites), and enable or disable various features used by system 100. In one embodiment, some of the features may include network diagnostics, error reporting, as well as controlling, for example, prefetch response abort 142. Such control may be adding and/or removing pages (i.e. URLs) to or from whitelist 148 and/or blacklist 149.

In one embodiment, the user selects a universal recourse locator (URL) address which directs web browser 106 (e.g., Internet Explorer®, Firefox®, Netscape Navigator®, etc.) to a website (e.g., cnn.com, google.com, yahoo.com, etc.). In a further embodiment, web browser 106 may check browser cache 104 to determine whether the website associated with the selected URL is located within browser cache 104. If the website is located within browser cache 104 the amount of time the website has been in the cache is checked to determine if the cached website is "fresh" (i.e. new) enough to use. For example, the amount of time that a website may be considered fresh may be 5 minutes; however, other time limits may be used. Consequently, if the website has been cached and the website is considered fresh, then web browser 106 renders the cached page. However, if the website has either not been cached or the cached webpage is not fresh, web browser 106 sends a request to the Internet for the website.

In one embodiment, redirector 108 intercepts the request sent from web browser 106. Redirector 108 instead sends the request through a local bus 105 to proxy client 112. In some embodiments, proxy client 112 may be implemented as a software application running on user system 102. In an alternative embodiment, proxy client 112 may be implemented on a separate computer system and is connected to user system 102 via a high speed/low latency link (e.g., a branch office LAN subnet, etc.). In one embodiment, proxy client 112 includes a request parser 116. Request parser 116 may check cache optimizer 114 to determine if a cached copy of the requested website may still be able to be used. Cache optimizer 114 is in communication with browser cache 104 in order to have access to cached websites. Cache optimizer 114 is able to access browser cache 104 without creating a redundant copy of the cached websites, thus requiring less storage space.

According to one embodiment, cache optimizer 114 implements more effective algorithms to determine whether a cached website is fresh. In one embodiment, cache optimizer 114 may implement the cache expiration algorithms from HTTP v1.1 (i.e., RFC 2616), which may not be natively supported in web browser 106. For example, browser cache 104 may inappropriately consider a cached website as too old to use; however, cache optimizer 114 may still be able to use the cached website. More efficient use of cached websites can improve browsing efficiency by reducing the number of Internet accesses.

In one embodiment, if the requested website is not able to be accessed from the cached websites, request parser 116 checks prefetch manager 120 to determine if the requested website has been prefetched. Prefetching a website is when content from the website is accessed, downloaded and stored before a request to the website is made by web browser 106. Prefetching can potentially save round-trips of data access from user system 102 to the Internet.

In a further embodiment, if the requested website has not been prefetched, then request parser 116 forwards the request to a request encoder 118. Request encoder 118 encodes the request into a compressed version of the request using one of many possible data compression algorithms. For example, these algorithms may employ a coding dictionary 122 which stores strings so that data from previous web objects can be used to compress data from new pages. Accordingly, where the request for the website is 550 bytes in total, the encoded request may be as small as 50 bytes. This level of compression can save bandwidth on a connection, such as high latency link 130. In one embodiment, high latency link 130 may be a wireless link, a cellular link, a satellite link, a dial-up link, etc.

In one embodiment, after request encoder 118 generates an encoded version of the request, the encoded request is forwarded to a protocol 128. In one embodiment, protocol 128 is Intelligent Compression Technology's® (ICT) transport protocol (ITP). Nonetheless, other protocols may be used, such as the standard transmission control protocol (TCP). In one embodiment, ITP maintains a persistent connection with proxy server 132. The persistent connection between proxy client 112 and proxy server 132 enables system 100 to eliminate the inefficiencies and overhead costs associated with creating a new connection for each request.

In one embodiment, the encoded request is forwarded from protocol 128 to request decoder 136. Request decoder 136 uses a decoder which is appropriate for the encoding performed by request encoder 118. In one embodiment, this process utilizes a coding dictionary 138 in order to translate the encoded request back into a standard format which can be accessed by the destination website. Furthermore, if the HTTP request includes a cookie (or other special instructions), such as a "referred by" or type of encoding accepted, information about the cookie or instructions may be stored in a cookie cache 152. Request decoder 136 then transmits the decoded request to the destination website over a low latency link 156. Low latency link 156 may be, for example, a cable modem connection, a digital subscriber line (DSL) connection, a T1 connection, a fiber optic connection, etc.

In response to the request, a response parser 144 receives a response from the requested website. In one embodiment, this response may include an attachment, such as an image and/or text file. Some types of attachments, such as HTML, XML, CSS, or Java Scripts, may include references to other "in-line" objects that may be needed to render a requested web page. In one embodiment, when response parser 144 detects an attachment type that may contain such references to "in-line" objects, response parser 144 may forward the objects to a prefetch scanner 146.

In one embodiment, prefetch scanner 146 scans the attached file and identifies URLs of in-line objects that may be candidates for prefetching. For example, candidates may be identified by HTML syntax, such as the token "img src=". In addition, objects that may be needed for the web page may also be specified in java scripts that appear within the HTML or CSS page or within a separate java script file. Methods for identifying candidates within Java scripts may be found in a co-pending U.S. patent application entitled, "METHODS AND SYSTEMS FOR JAVA SCRIPT PARSING", filed concurrently herewith which is incorporated by reference for any and all purposes. In one embodiment, the identified candidates are added to a candidate list.

In one embodiment, for the candidate URLs, prefetch scanner 146 may notify prefetch abort 142 of the context in which the object was identified, such as the type of object in which it was found and/or the syntax in which the URL occurred. This information may be used by prefetch abort 142 to determine the probability that the URL will actually be requested by web browser 106.

According to a further embodiment, the candidate list is forwarded to whitelist 148 and blacklist 149. Whitelist 148 and blacklist 149 may be used to track which URLs should be allowed to be prefetched. Based on the host (i.e. the server that is supplying the URL), the file type (e.g., application service provider (ASP) files should not be prefetched), etc. Accordingly, whitelist 148 and blacklist 149 control prefetching behavior by indicating which URLs on the candidate list should or should not be prefetched. In many instances with certain webpages/file types prefetching may not work. In addition to ASP files, webpages which include fields or cookies may have problems with prefetching.

In one embodiment, once the candidate list has been passed through whitelist 148 and blacklist 149, a modified candidate list is generated and then the list is forwarded to a client cache model 150. The client cache model 150 attempts to model which items from the list will be included in browser cache 104. As such, those items are removed from the modified candidate list. Subsequently, the updated modified candidate list is forwarded to a request synthesizer 154 which creates an HTTP request in order to prefetch each item in the updated modified candidate list. The HTTP request header may include cookies and/or other instructions appropriate to the web site and/or to web browser 106's preferences using information obtained from cookie model 152. The prefetch HTTP requests may then be transmitted through low latency link 156 to the corresponding website.

In one embodiment, response parser 144 receives a prefetch response from the website and accesses a prefetch response abort 142. Prefetch response abort 142 is configured to determine whether the prefetched item is worth sending to user system 102. Prefetch response abort 142 bases its decision whether to abort a prefetch on a variety of factors, which are discussed below in more detail.

If the prefetch is not aborted, response parser 144 forwards the response to response encoder 140. Response encoder 140 accesses coding dictionary 138 in order to encode the prefetched response. Response encoder 140 then forwards the encoded response through protocol 128 over high latency link 130 and then to response decoder 126. Response decoder 126 decodes the response and forwards the response to response manager 124. In one embodiment, if the response is a prefetched response, then response manager 124 creates a prefetch socket to receive the prefetched item as it is downloaded.

Response manager 124 transmits the response over local bus 105 to redirector 108. Redirector 108 then forwards the response to web browser 106 which renders the content of the response.

Figure 2:
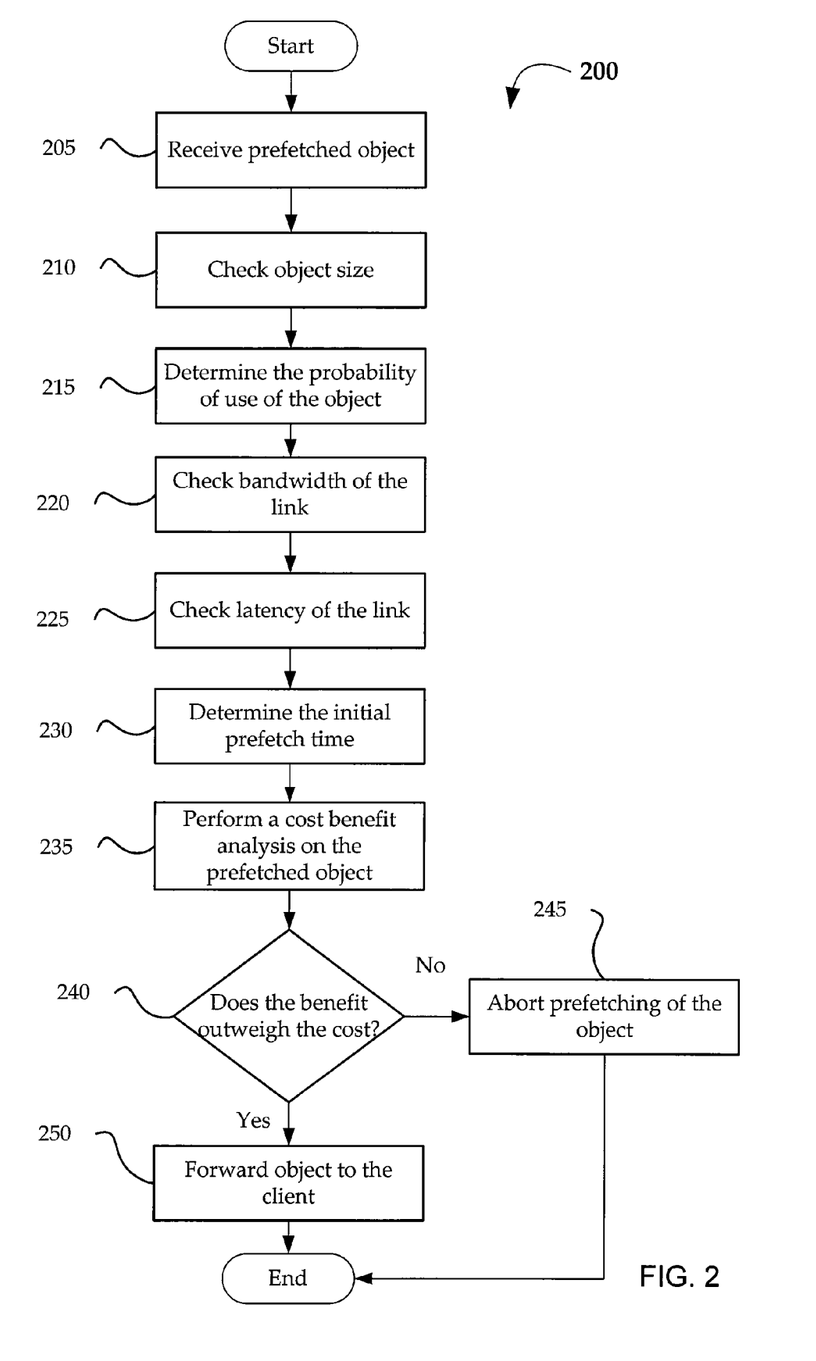
FIG. 2 is a flow diagram illustrating a method for performing prefetch abort operations, according to one embodiment of the present invention.

Turning now to FIG. 2, which illustrates method 200, one embodiment of the operations preformed by prefetch response abort 142 (FIG. 1). As discussed above, prefetch response abort 142 (FIG. 1) receives a prefetched object from the Internet through low latency link 156 (FIG. 1) (process block 205). Even though the object has initially been prefetched, it does not necessarily mean that it is efficient to forward the object to the client (e.g., proxy client 112 (FIG. 1)). Due to bandwidth and other constraints of the link, objects sent over high latency link 130 (FIG. 1) between proxy server 132 (FIG. 1) and proxy client 112 (FIG. 1) should be carefully selected. Accordingly, a variety of factors should be considered before forwarding a prefetched object to the client.

At process block 210, the size of the received object is checked. In one embodiment, the size of the object may be significant in determining whether to forward the object to the client. For example, one benefit to forwarding the prefetched object to the client may be the elimination of a round trip. In other words, if a prefetched item is eventually used by user system 102 (FIG. 1) the request out to the Internet and the response back from the requested website (i.e., one round trip) can be eliminated. Hence, in some instances, the smaller the prefetched object is, the more beneficial the prefetch is for optimization purposes.

Furthermore, one potential negative effect of forwarding a prefetched object is that the prefetched object unnecessarily uses the link's bandwidth. As such, if a prefetched object is forwarded to the client but never used by the client, the bandwidth used to forward the object may be wasted. Accordingly, larger prefetched objects may decrease optimization because the gained round trip may not outweigh the bandwidth consumption. In one embodiment, a point system may be assigned to the prefetched object where, for example, a 10 kilobyte object is given a higher point value than maybe a 10 megabyte object. Consequently, if the point value associated with the object reaches or exceeds a threshold, then the object is forwarded to the client.

Another factor in determining whether an object should be forwarded to the client is the probability of use of the object (process block 215). As a user browses the Internet, not all URLs that are prefetched will actually be requested by web browser 106. The user may, for example, "click-off" a web page before objects within the page are requested. Whether some objects may be requested may depend on browser settings and/or on external events, such as mouse position. Furthermore, objects referenced on a CSS (e.g., style sheet for the entire website) may not be used on each individual web page. In addition, if URLs are identified within Java scripts, the scripts themselves, based on a variety of factors, may determine whether to request an object.

In one embodiment, the probability that an object will actually be requested by web browser 106 may be estimated as a function of the context in which the reference was identified. For example, this context may depend on the type of the object (e.g., HTML, CSS, JS, etc.), the surrounding syntax (e.g., "img src=", java script, etc.), and the level of recursion (e.g., was the reference on the main HTML or on an object that was itself prefetched). In one embodiment, if the object was referenced in a Java script, the probability of use may depend on information collected while parsing the script. The probability that an object in a specific context will be requested can be estimated in several ways. For example, a general model can be built sampling many different clients in many sessions going to many websites. Subsequently, a more specific model can be developed for a specific web site and/or for a particular user. In one embodiment, this may be accomplished by recording the frequency of page use in a specific context for a specific web page by a specific user.

Collectively, based on the above mentioned probability factors, the object may be assigned a point value associated with its probability of use. In an alternative embodiment, the probability of use may be assigned a percentage value.

At process block 220, the bandwidth of high latency link 130 (FIG. 1) may be determined (i.e. the speed of the link between proxy server 132 (FIG. 1) and proxy client 112 (FIG. 1)). The bandwidth of this link can be a factor in determining whether to forward the prefetched object. For example, with a higher link bandwidth, more objects and larger objects could be forwarded to the client. However, in contrast, if the bandwidth of the link is lower, then prefetch response abort 142 (FIG. 1) may be more selective when deciding whether to forward the prefetched object. In one embodiment, the bandwidth of the link is assigned a point value which may be factored into the determination of whether to forward the object.

At process block 225, the latency of the link between proxy server 132 (FIG. 1) and proxy client 112 (FIG. 1) is determined. In one embodiment, the latency of the link is based on the current round trip time (RTT) of the link. Accordingly, if the RTT is high, then it may be more beneficial to forward the prefetched object to the client because of the round trip savings gained by forwarding the object. However, if the RTT is low, then the saved round trip may be of less value for optimization purposes. In one embodiment, the latency of the link is assigned a point value which may be factored into the determination of whether to forward the object.

In process block 230, the initial prefetch time is determined (i.e., how long the object took to be retrieved from the Internet). If the object took a long time to retrieve from the Internet, then it may be optimal to forward the object to the client in order to avoid re-downloading the object in the future. Furthermore, if the object was downloaded quickly, then less optimization may be gained from forwarding the object to the client. Hence, in one embodiment, the download time of the object may be assigned a point value which may be factored into determining whether to forward the object to the client. In an alternative embodiment, the aborted objects may be stored on server 132 (FIG. 1) in case they are subsequently requested. Accordingly, if these objects are stored and then requested, the download will not need to be repeated. If this approach is implemented, then process block 230 may not be used.

At process block 235, a cost/benefit analysis may be preformed to determine whether to forward the prefetched object. In one embodiment, the above mentioned point values may be calculated to determine if the object meets a predetermined threshold. In an alternative embodiment, the cost of forwarding the object may be determined using the following equation:

Cost=ObjectSize*(1.0−ProbabilityofUse)/Bandwidth

Furthermore, in one embodiment, the benefit of forwarding the prefetched object may be determined using the following equation:

Benefit=ProbabilityofUse*(RRT+PrefetchTime)

Accordingly, by using these or other equations, at decision block 240, if the cost value is greater than the benefit value then the prefetched object is aborted and the object is not forwarded to the client (process block 245). Conversely, if the benefit is greater than the cost, then the prefetched object is forwarded to the client (process block 250). In an alternative embodiment, objects that have been aborted may be cached at, for example proxy server 132 (FIG. 1), in the event that the client subsequently requests the object. Hence, the above referenced equation may be reduced to:

Benefit=ProbabilityofUse*RRT

The equation is reduced in this manner because, since the object has already been downloaded, it would not need to be re-downloaded from the originating server.

A number of variations and modifications of the disclosed embodiments can also be used. For example, the factors used to determine whether to forward a prefetched object may be used outside the website and/or Internet context. For example, the prefetching technique may be used to determine which terminals to download an object from in a peer-to-peer network environment. In addition, the prefetching technique may be used on various network types, for example, a satellite network, a mobile device network, etc.

Figure 3:
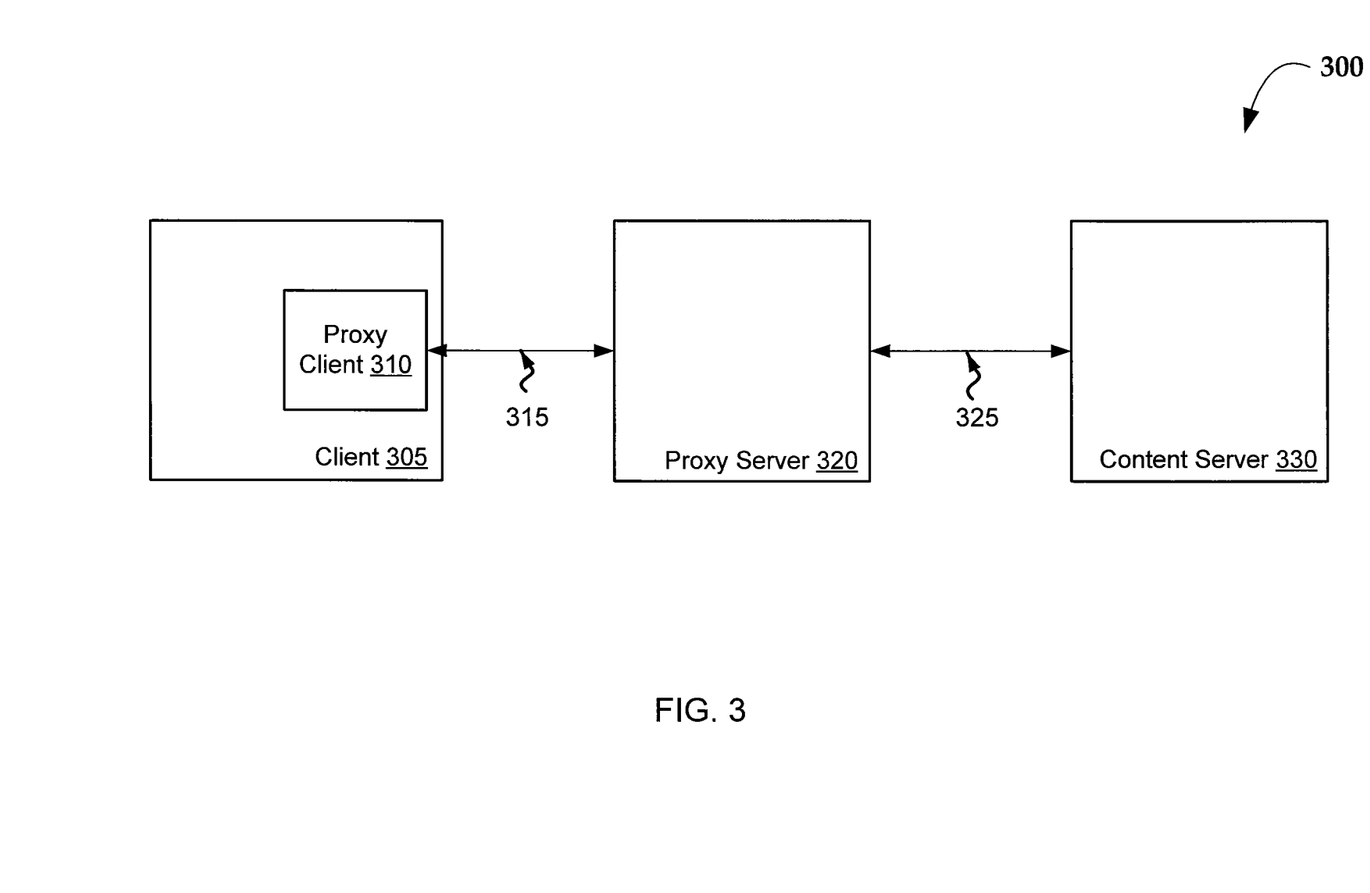
FIG. 3 is a block diagram illustrating a system for accelerating network communications, according to one embodiment of the present invention.

Referring now to FIG. 3, which illustrates a system 300 for providing network acceleration. In one embodiment, user system 102 in FIG. 1 may be client 305 and proxy client 112 in FIG. 1 may be proxy client 310. Client 305 may generate a request for content from content server 330. In one embodiment, content server 330 may be a web server, a file server, a mail server, etc., and the content request may be for a file, a webpage, an email message, etc.

Proxy client 310 may be configured to intercept the content request from client 305 and transmit the request over high latency link 315 to proxy server 320 on behalf of client 305. In one embodiment, high latency link 315 may be a satellite link, a cellular link, a wireless link, etc. In one embodiment, the content request may include references to prefetchable content. Accordingly, proxy server 320, while prefetching objects for network acceleration would utilize the prefetch abort systems and methods described in FIGS. 1 and 2.

In a further embodiment, communications between proxy server 320 and content server 330 over low latency link 325 are sufficiently fast that acceleration is not needed or would not provide sufficient benefit for the cost needed to accelerate. Hence, upon receipt of communications from content server 330, proxy server 320 accelerates the communications between proxy server 320 and proxy client 310 in order to accelerate communications over high latency link 315. Accordingly, the network traffic over high latency link 315 is accelerated while network traffic over low latency link 325 remains relatively unchanged.

Figure 4:
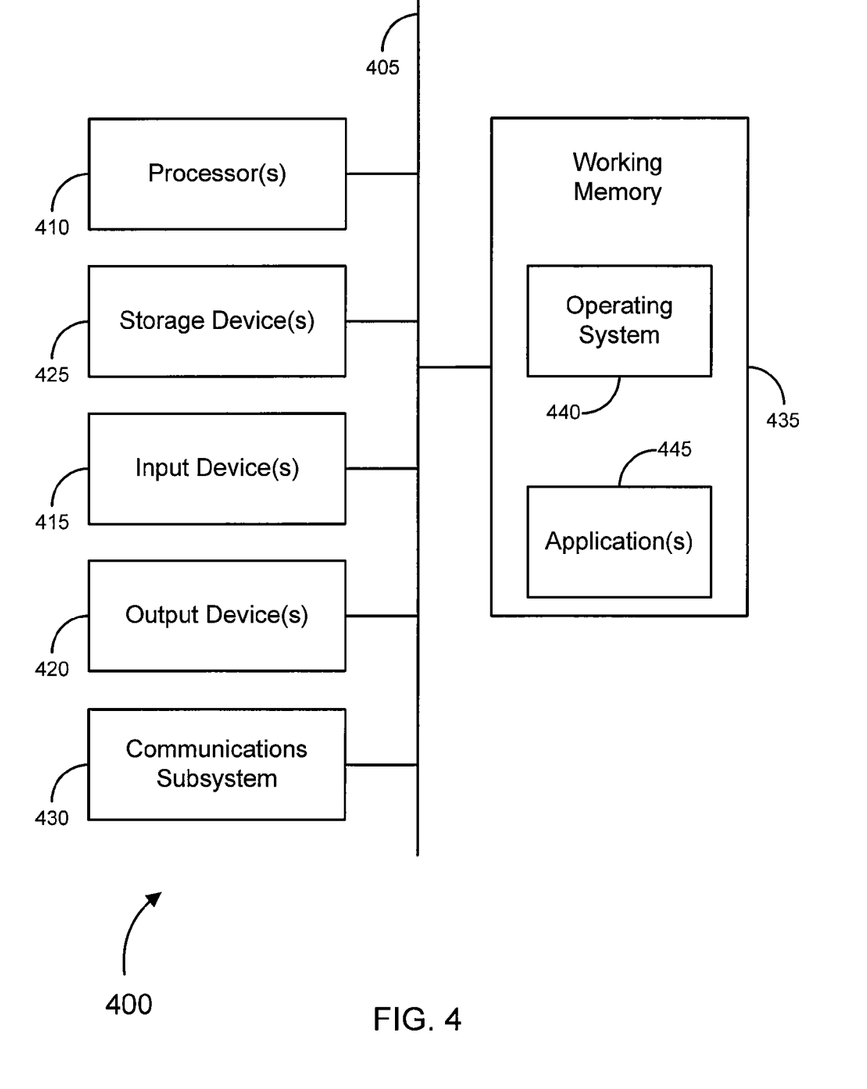
FIG. 4 is a generalized schematic diagram illustrating a computer system, in accordance with various embodiments of the invention.

FIG. 4 provides a schematic illustration of one embodiment of a computer system 400 that can perform the methods of the invention, as described herein, and/or can function, for example, as any part of client 305, proxy server 320, or content server 330 in FIG. 3. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation dynamic memory, such as the working memory 435. Transmission media includes coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
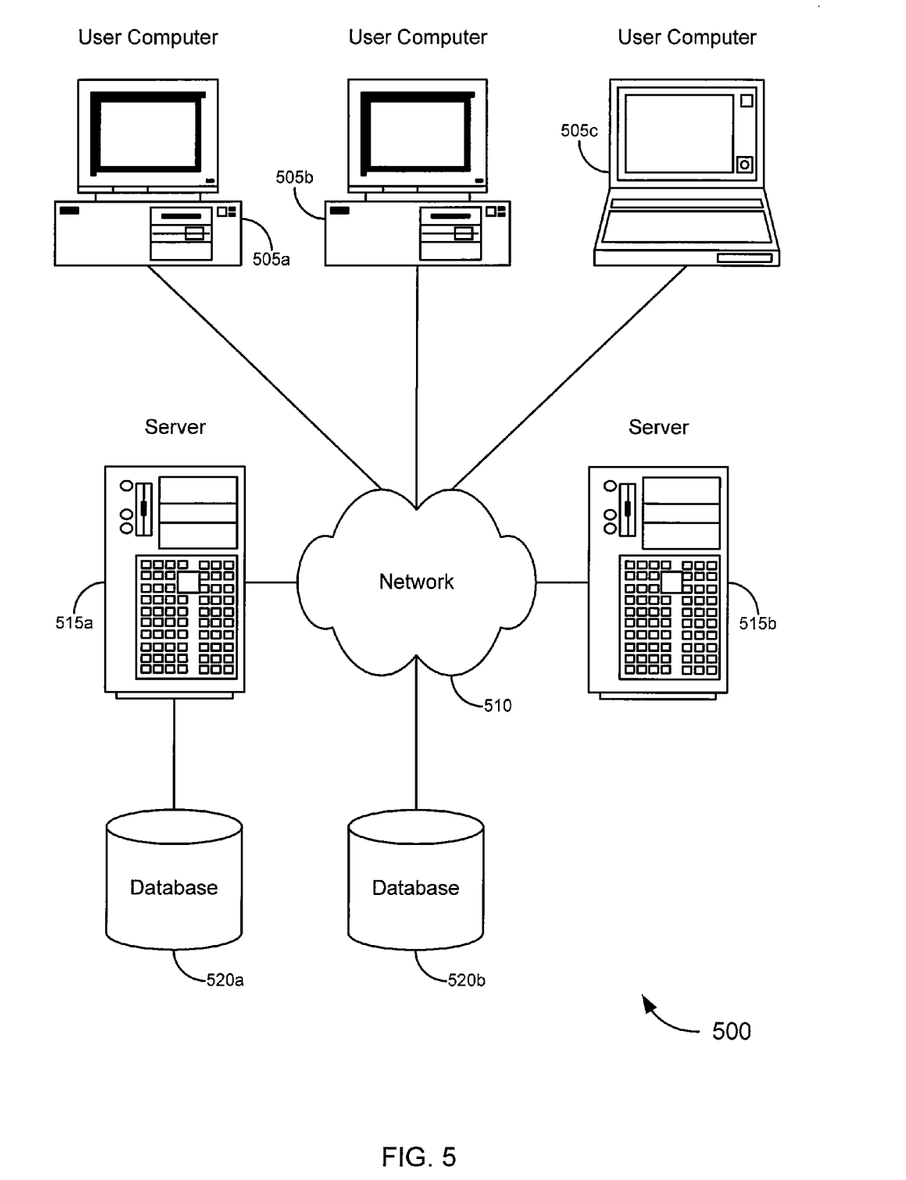
FIG. 5 is a block diagram illustrating a networked system of computers, which can be used in accordance with various embodiments of the invention.

A set of embodiments comprises systems for implementing staged configurator modeling. In one embodiment, proxy server 320 and/or client 305 (as shown in FIG. 3) may be implemented as computer system 400 in FIG. 4. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 505 and/or another server 515. In some embodiments, an application server can create web pages dynamically for displaying the information in accordance with embodiments of the invention, such as information displayed web browser 106 in FIG. 1. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as the database can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of determining whether to abort a prefetch operation, the method comprising:
    determining that an object is to be prefetched from a content server to a proxy server based on part on the probability that the object will be accessed by a client;
    prefetching, at the proxy server, the object from the content server, wherein the proxy server and the content server are in communication over a link between the proxy server and the content server, and wherein the prefetching, at the proxy server, the object from the content server comprises receiving the prefetched object at the proxy server;
    checking, in response to receipt of the prefetched object at the proxy server, the prefetched object to determine the prefetched object's size;
    determining a probability of use of the prefetched object;
    checking a link between the proxy server and a client to determine the link's bandwidth;
    based on the size of the prefetched object, the probability of use of the prefetched object, and the bandwidth of the link, determining, at the proxy server, whether prefetching of the prefetched object from the proxy server to the client should be aborted; and
    in response to determining that prefetching to the client of the prefetched object should be aborted, abstaining from forwarding the prefetched object from the proxy server to the client.

2. The method of determining whether to abort a prefetch operation as recited in claim 1, wherein the link between the proxy server and the content server is a low latency link and wherein the link between the proxy server and the client is a high latency link.

3. The method of determining whether to abort a prefetch operation as recited in claim 1, wherein a user history is used, at least in part, to determine a probability of use of the prefetched object.

4. The method of determining whether to abort a prefetch operation as recited in claim 1, wherein the size of the prefetched object, the probability of use of the prefetched object, the bandwidth of the link, a latency of the link, and an amount of time associated with the initial download of the prefetched object are each assigned a point value.

5. The method of determining whether to abort a prefetch operation as recited in claim 4, wherein the point values are summed to generate a total point value.

6. The method of determining whether to abort a prefetch operation as recited in claim 5, wherein if the total point value is greater than or equal to a threshold value, then the prefetched object is forwarded to the client.

7. The method of determining whether to abort a prefetch operation as recited in claim 1, further comprising determining an amount of time associated with an initial download of the prefetched object from the Internet.

8. The method of determining whether to abort a prefetch operation as recited in claim 1, further comprising communicating the prefetched object from the proxy server to the client in response to the determining whether prefetching of the prefetched object from the proxy server to the client should be aborted.

9. The method of determining whether to abort a prefetch operation as recited in claim 1, further comprising performing a cost-benefit analysis on the prefetched object.

10. The method of determining whether to abort a prefetch operation as recited in claim 1, further comprising, based on the cost-benefit analysis, determining whether the cost of prefetching the object outweighs the benefit of prefetching the object.

11. The method of determining whether to abort a prefetch operation as recited in claim 10, wherein if the cost outweighs the benefit, then not prefetching the object, and wherein if the benefit outweighs the cost, then prefetching the object.

12. The method of determining whether to abort a prefetch operation as recited in claim 1, further comprising based on determining to prefetch the prefetched object, forwarding the prefetched object to the client.

13. A system for determining whether to abort a prefetch operation, the system comprising:
    a content server configured to:
        transmit objects over a network connection;
    a proxy server coupled with the content server via the network connection, the proxy server configured to:
        determine that an object is to be prefetched from a content server to a proxy server based in part on the probability that the object will be accessed by a client;
        prefetch the object from the content server, wherein prefetching the object from the content server comprises receiving the prefetched object at the proxy server;
        check, in response to receipt of the prefetched object at the proxy server, the prefetched object to determine the prefetched object's size;
        determine a probability of use of the prefetched object;
        determine an amount of time associated with the initial download of the prefetched object;
        check a link between the proxy server and a client to determine the link's bandwidth;
        determine a latency of the link between the proxy server and the client; and
        based on the size of the prefetched object, the probability of use of the prefetched object, the bandwidth of the link, the amount of time associated with the initial download of the prefetched object, and the latency of the link, determine whether prefetching of the prefetched object from the proxy server to the client should be aborted, and in response to a determination that prefetching to the client of the prefetched object should be aborted, abstain from forwarding the prefetched object from the proxy server to the client.

14. The system for determining whether to abort a prefetch operation as recited in claim 13, wherein the client system further comprises a proxy client.

15. The system for determining whether to abort a prefetch operation as recited in claim 14, wherein the proxy client is configured to intercept communications between the client and the proxy server.

16. The system for determining whether to abort a prefetch operation as recited in claim 15, wherein the proxy client and the proxy server are configured to provide network acceleration for the client.

17. A non-transitory machine-readable medium having sets of instructions stored thereon which, when executed by one or more machines, cause the one or more machines to:
  determine that an object is to be prefetched from a content server to a proxy server based on part on the probability that the object will be accessed by a client;
  prefetch, at the proxy server, the object from the content server, wherein the proxy server and the content server are in communication over a link between the proxy server and the content server, and wherein prefetching the object from the content server comprises receiving the prefetched object at the proxy server;
  check, in response to receipt of the object at the proxy server, the prefetched object to determine the prefetched object's size;
  determine a probability of use of the prefetched object;
  determine an amount of time associated with the initial download of the prefetched object;
  check a link between the proxy server and a client to determine the link's bandwidth;
  based on the size of the prefetched object, the probability of use of the prefetched object, the bandwidth of the link, and the amount of time associated with the initial download of the prefetched object, determine whether prefetching of the prefetched object from the proxy server to the client should be aborted
  in response to determining that prefetching to the client of the prefetched object should be aborted, abstaining from forwarding the prefetched object from the proxy server to the client.

18. The non-transitory machine-readable medium as recited in claim 17, wherein the sets of instructions which, when further executed by the one or more machines, cause the one or more machines to, based on the cost-benefit analysis, determine whether the cost of prefetching the object outweighs the benefit of prefetching the object.

19. The non-transitory machine-readable medium as recited in claim 18, wherein if the cost outweighs the benefit, then not prefetching the object, and wherein if the benefit outweighs the cost, then prefetching the object.

* * * * *